United States Patent
Penicaud et al.

(10) Patent No.: US 11,339,042 B2
(45) Date of Patent: May 24, 2022

(54) MOBILE ELEVATING WORK PLATFORM/STOCK PICKER

(71) Applicant: JLG Industries, Inc., McConnellsburg, PA (US)

(72) Inventors: Pascal Pierre Penicaud, Tonneins (FR); Pascal Richard, Tonneins (FR); Vincent Paul Philippe Paquiot, Agen (FR); Zachary Carrington Foster, Hagerstown, MD (US)

(73) Assignee: JLG INDUSTRIES, INC., McConnellsburg, PA (US)

( * ) Notice: Subject to any disclaimer, the term of this patent is extended or adjusted under 35 U.S.C. 154(b) by 560 days.

(21) Appl. No.: 16/388,922

(22) Filed: Apr. 19, 2019

(65) Prior Publication Data

US 2019/0322511 A1 Oct. 24, 2019

Related U.S. Application Data

(60) Provisional application No. 62/660,391, filed on Apr. 20, 2018.

(51) Int. Cl.
| | | |
|---|---|---|
| *B66F 11/04* | (2006.01) | |
| *B60K 7/00* | (2006.01) | |
| *B62D 3/02* | (2006.01) | |
| *B62D 5/04* | (2006.01) | |

(52) U.S. Cl.
CPC ............ *B66F 11/04* (2013.01); *B60K 7/0007* (2013.01); *B62D 3/02* (2013.01); *B62D 5/0421* (2013.01)

(58) Field of Classification Search
CPC ........ B66F 11/04; B66F 9/07568; B62D 3/02; B62D 5/0421
See application file for complete search history.

(56) References Cited

U.S. PATENT DOCUMENTS

| | | | | |
|---|---|---|---|---|
| 2,618,396 | A * | 11/1952 | Belt | B66F 9/07568 414/633 |
| 2,997,721 | A * | 8/1961 | Hopfeld | B66F 11/04 4/626 |
| 3,360,078 | A * | 12/1967 | Hopfeld | E04G 1/18 187/222 |

(Continued)

FOREIGN PATENT DOCUMENTS

| | | |
|---|---|---|
| EP | 2 295 366 | 3/2011 |
| EP | 2 641 862 | 9/2013 |

(Continued)

OTHER PUBLICATIONS

International Search Report dated Jul. 31, 2019 issued in PCT International Patent Application No. PCT/US2019/028128, 3 pp.

(Continued)

*Primary Examiner* — Brian L Swenson
(74) *Attorney, Agent, or Firm* — Nixon & Vanderhye P.C.

(57) ABSTRACT

A mobile elevating work platform includes a chassis and fixed wheels, caster wheels, and a driving and steering wheel secured to the chassis. A control implement coupled with the driving and steering wheel is configured to adjust a steering position of the driving and steering wheel. A drive motor is operable to drive the driving and steering wheel. A platform may be raisable and lowerable with a mast assembly. The control implement may be adjustable to accommodate operator physical characteristics.

13 Claims, 20 Drawing Sheets

(56) References Cited

U.S. PATENT DOCUMENTS

| | | | |
|---|---|---|---|
| 3,515,233 A * | 6/1970 | Stammen | B66F 9/08 |
| | | | 180/13 |
| 3,787,064 A | 1/1974 | De Priester et al. | |
| 4,683,973 A | 8/1987 | Honjo et al. | |
| 4,813,512 A * | 3/1989 | McCormick | B60K 17/30 |
| | | | 180/253 |
| 5,740,887 A | 4/1998 | Unger et al. | |
| 5,850,892 A * | 12/1998 | Citron | E04G 1/22 |
| | | | 182/148 |
| 2007/0095594 A1* | 5/2007 | Prehn | B66F 9/07572 |
| | | | 180/254 |
| 2019/0225469 A1* | 7/2019 | Lemke | B66F 9/07554 |

FOREIGN PATENT DOCUMENTS

| | | |
|---|---|---|
| JP | 2003-118987 | 4/2003 |
| WO | WO 98/09910 | 3/1998 |
| WO | WO 2012/096570 | 7/2012 |

OTHER PUBLICATIONS

Extended European Search Report dated Dec. 4, 2019 issued in European Patent Application No. 19170356.0, 13 pp.

\* cited by examiner

MOBILE ELEVATING WORK PLATFORM/STOCK PICKER

CROSS-REFERENCES TO RELATED APPLICATIONS

This application claims the benefit of U.S. Provisional Patent Application No. 62/660,391, filed Apr. 20, 2018, the entire content of which is herein incorporated by reference.

STATEMENT REGARDING FEDERALLY SPONSORED RESEARCH OR DEVELOPMENT (NOT APPLICABLE)

BACKGROUND

The invention relates to a mobile elevating work platform (MEWP). In one aspect, the targeted area is the design of the chassis. In another aspect, the targeted area is the design of the vertical telescopic mast. In still another aspect, the targeted area is the design of the control box/controls configuration for the MEWP.

Existing self-propelled MEWPs typically have four wheels for stability. One version includes two steering wheels at the front of the machine. This version, however, has implementation difficulties to limit the turning radius and have the center of gyration in the middle of the rear axle (torque and speed). Additionally, it is difficult to accurately control the motors during extreme steering (90°). The system is also often overly bulky.

Another version includes two rear drive wheels that can be turned in opposite directions and two free caster wheels at the front of the machine. This version, however, suffers from bad controllability and predictability of the caster wheel movement when changing direction. Problems also arise due to wheel diameters and the large offset (king pin and wheel pin), i.e., the wheels exceed the gauge when changing direction. Stability is worse than the first version (inner tilting line by the offset value), and the construction has undesirable high sensibility to ground irregularities and to obstacles (uncontrolled wheels steering changing).

There are two types of masts typically used for these applications. A square mast includes a telescopic tube extended by means of telescopic cylinder or cylinder and chains. This proven technology has high rigidity for added stability, but requires specific dimensions for elevation beyond 3 m. Another typical mast is made of extruded aluminum profiles (e.g., telescopic forklift principle). This structure also requires specific dimensions for elevation beyond 3 m. Additionally, there are workload limitations to be at an acceptable stress level in the profile, and the construction requires many and complex components (sheaving by chains or cable), and significant assembly time.

BRIEF SUMMARY

The described embodiments in one aspect combine the advantages of existing solutions together with limiting the drawbacks including:
  Controllability of the steering system and predictability of the path
  Insensitivity to ground irregularities
  Limitation of oversized elements and optimization of the MEWP stability
  Compact system Objectives of the described configuration include, among other things, improved stability and optimal traction.

Another object is to propose a compact mast system that enables a telescoping height beyond 5 m without reduction in performance (mast capacity).

In an exemplary embodiment, a mobile elevating work platform includes a chassis, a pair of fixed wheels secured to the chassis, a pair of caster wheels secured to the chassis, and a driving and steering wheel secured to the chassis. A control implement coupled with the driving and steering wheel is configured to adjust a steering position of the driving and steering wheel. A drive motor is operable to drive the driving and steering wheel.

The driving and steering wheel may be secured to the chassis between the pair of caster wheels.

The control implement may be coupled with the drive motor and may include a drive switch that is configured to activate the drive motor.

The mobile elevating work platform may also include a driving wheel suspension secured between the driving and steering wheel and the chassis. In one aspect, the driving wheel suspension is a spring. The chassis may include a pivot link, where the drive motor and the driving and steering wheel are pivotally secured to the chassis via the pivot link.

The driving and steering wheel may be connected to a wheel gear that is rotatable relative to the chassis. The control implement may be coupled with a steering motor that drives a steering gear engaging the wheel gear.

The chassis may include a pair of fixed rear wheel wells, a pair of caster wheel wells, a driving and steering wheel well, and mast supports.

A mast may be secured to the chassis that is displaceable between a lowered position and a raised position, and a work platform may be coupled and displaceable with the mast. In one aspect, the mast may include a plurality of telescoping mast sections, where each of the telescoping mast sections has a cross member and two profile units one each connected to opposite ends of the cross member. Each of the two profile units may include a connector portion and a receiver portion. The mast may also include a V-shape slide member disposed between the connector portions of one of the mast sections and the receiver portions of an adjacent mast section. Each of the cross members may be longer than an adjacent cross member such that each of the telescoping mast sections fits over an adjacent mast section.

The control implement may include a housing, a handle coupled with the housing and maneuverable between an initial position and an adjusted position, and a lock bar cooperable with the handle and displaceable between a lock position and an unlock position. The handle may be maneuverable between the initial position and the adjusted position when the lock bar is in the unlock position. A back plate may be coupled with the housing and cooperable with the handle and the lock bar. The lock bar may be positioned between the handle and the back plate, and the back plate may include locking tabs engaging the handle when the lock bar is in the lock position.

BRIEF DESCRIPTION OF THE DRAWINGS

These and other aspects and advantages will be described in detail with reference to the accompanying drawings, in which.

DETAILED DESCRIPTION

With reference to FIGS. 1-6, an exemplary configuration of a mobile elevating work platform (MEWP) 10 includes a rigid chassis 12 with four wheels including two stabilizing caster wheels 14 at the front and two fixed wheels 16 at the rear. The four wheels 14, 16 ensure machine stability. A driving and steering wheel 18 is secured to the chassis 12. The driving and steering wheel 18 is mounted on suspension (described in more detail below) to maintain the best possible traction and absorb ground irregularities. In the exemplary construction shown in FIG. 4, the driving and steering wheel 18 is secured to the chassis 12 between the pair of caster wheels 14.

In an alternative construction, the chassis 12 may be provided with three wheels and two caster wheels mounted on suspension. The suspension travel directly affects traction (adaptation to ground conditions) and stability of the MEWP.

Figure 1:
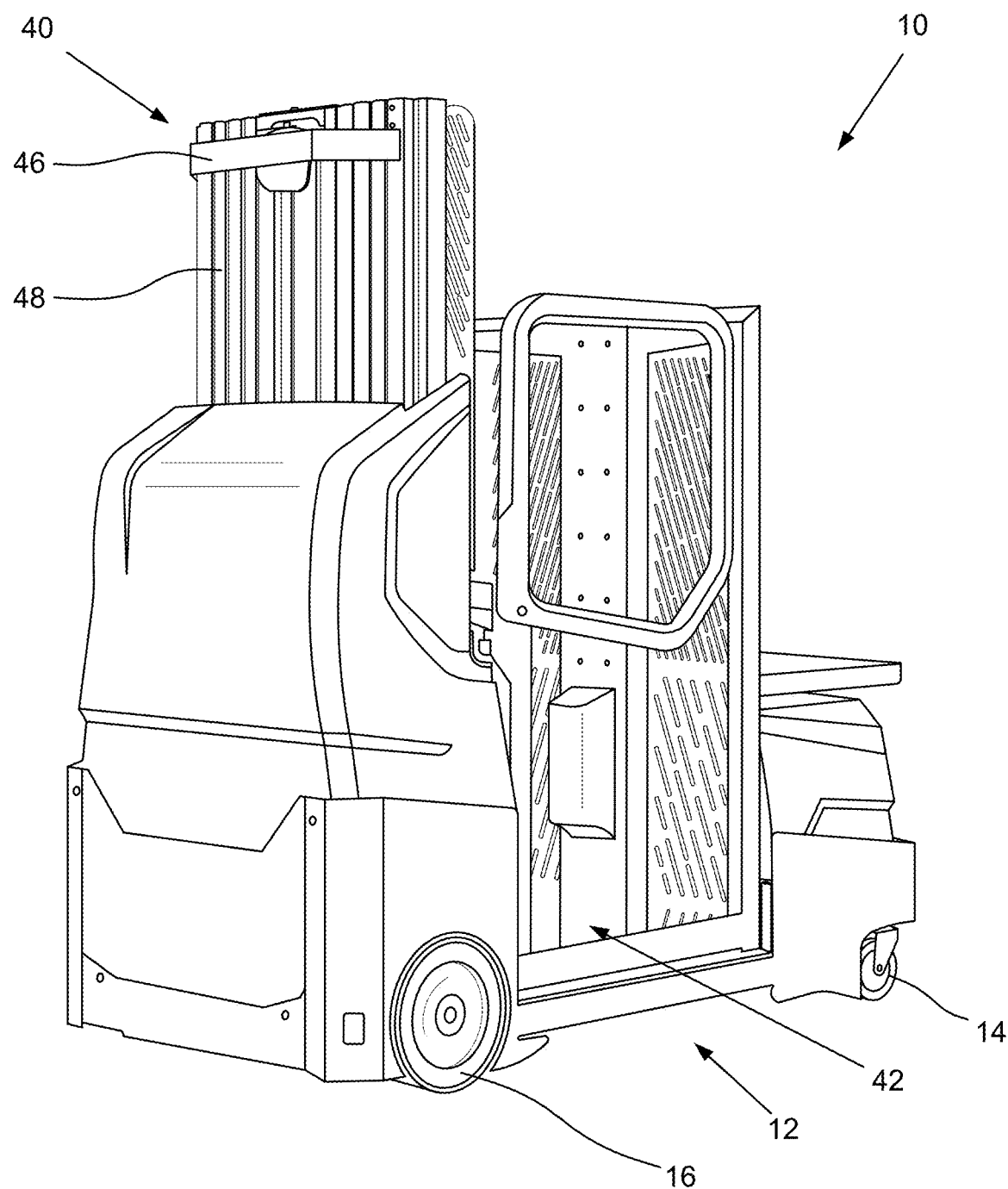
FIGS. 1 and 2 show the mobile elevating work platform vehicle.
Figure 2:
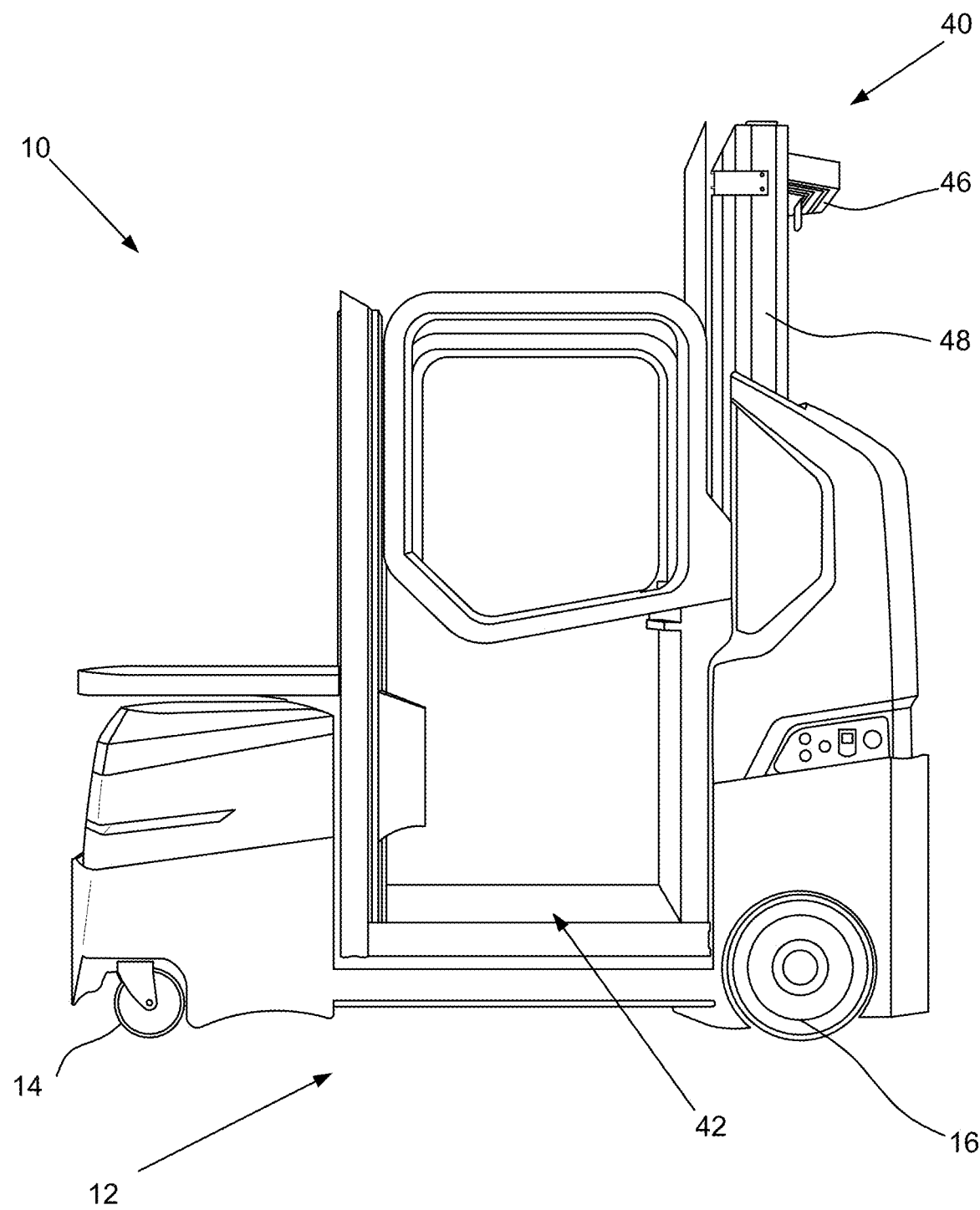
Figure 3:
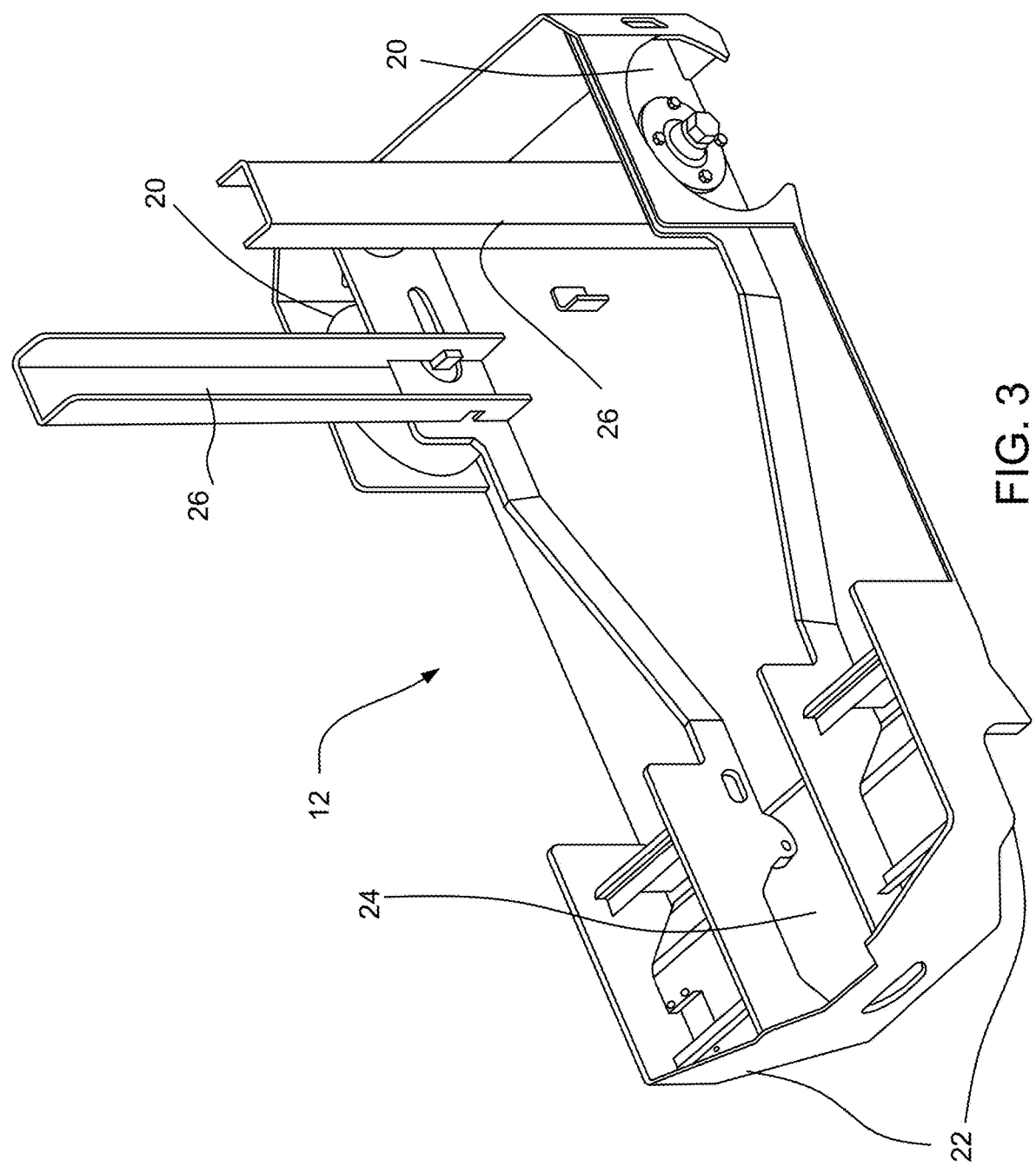
FIG. 3 is a perspective view of the vehicle chassis.

As shown in FIG. 3, the chassis 12 includes a pair of fixed wheel wells 20, a pair of caster wheel wells 22, and a driving and steering wheel well 24. Mast supports 26 are also secured to the chassis 12. In the exemplary embodiment shown in FIG. 3, the mast supports 26 are fixed to the chassis 12 adjacent the fixed rear wheel wells 20. The fixed wheels 16 are secured in the fixed wheel wells 20, the caster wheels 14 are secured in the caster wheel wells 22, and the driving and steering wheel 18 is secured in the driving and steering wheel well 24.

Figure 4:
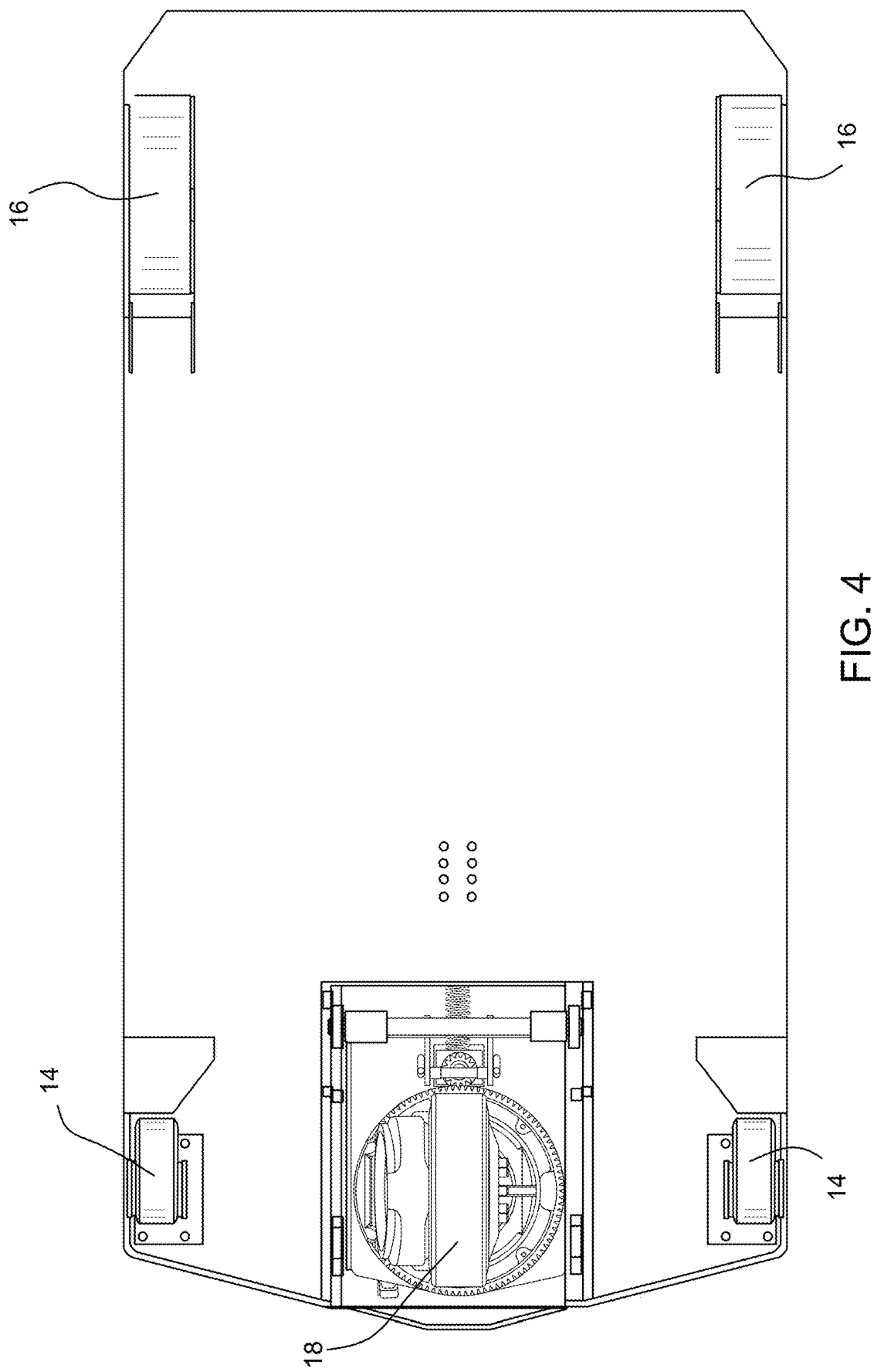
FIG. 4 is an underside view of the vehicle.
Figure 5:
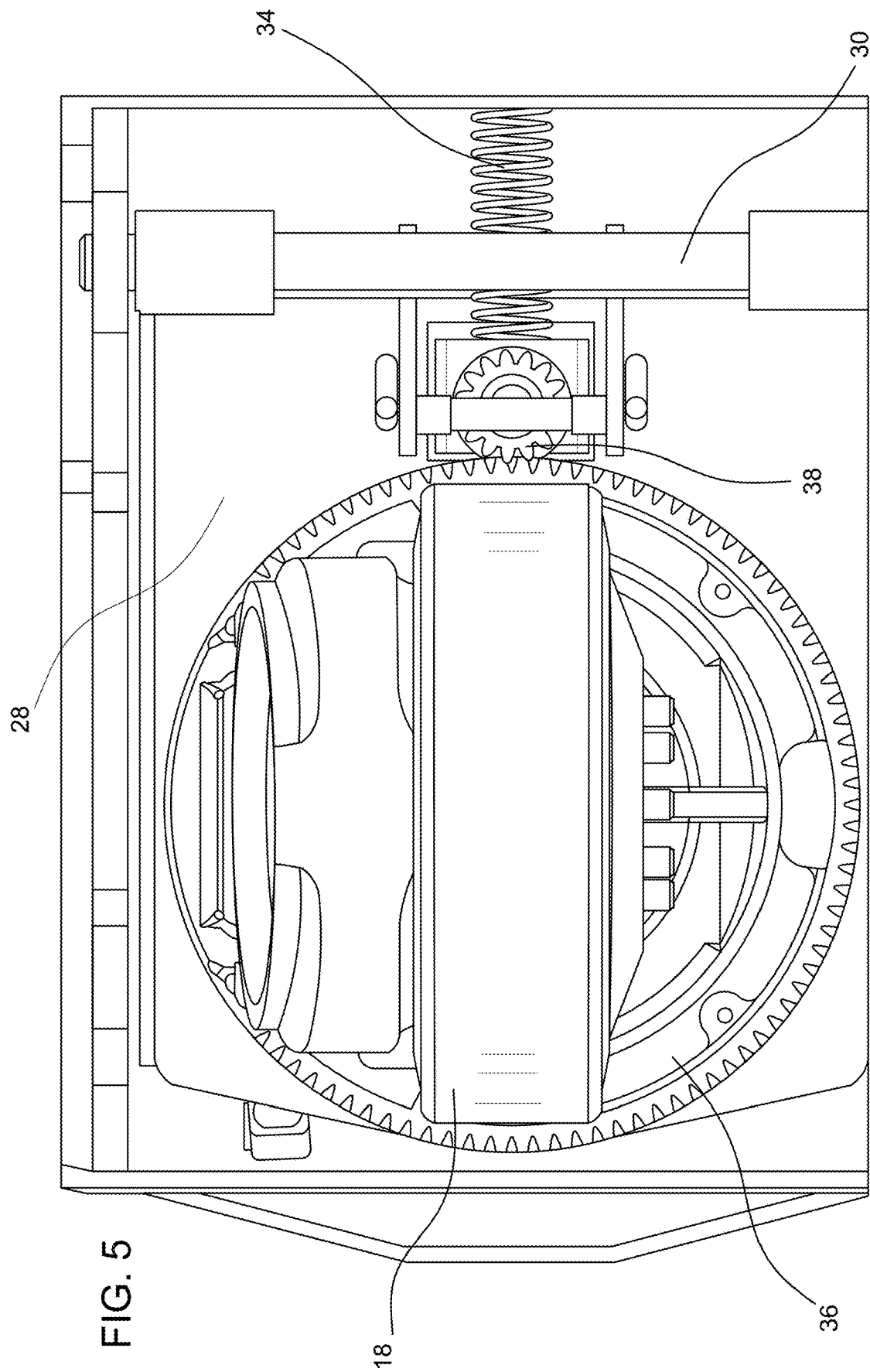
FIGS. 5 and 6 show the driving and steering wheel and driving motor.
Figure 6:
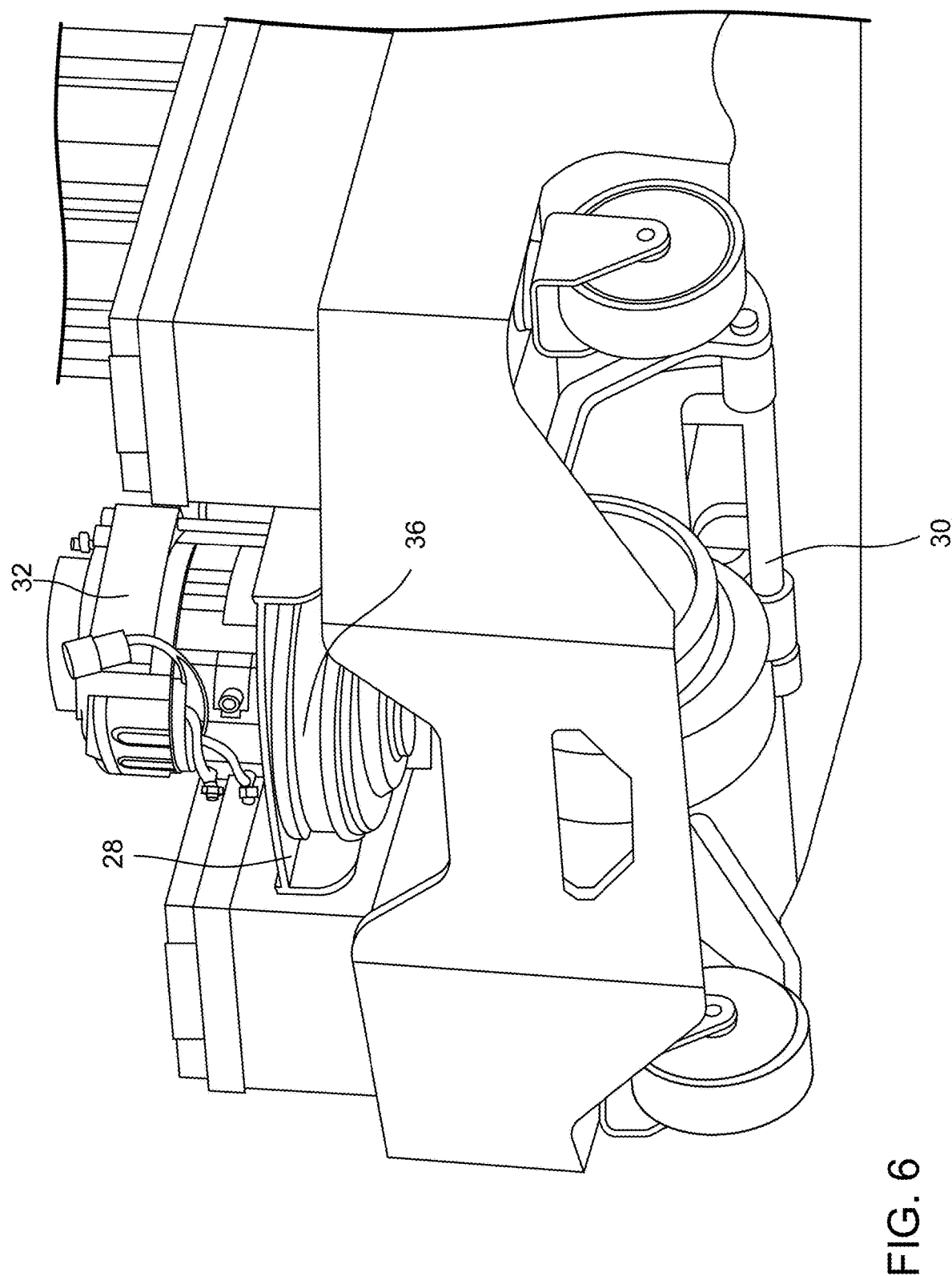

With reference to FIGS. 4-6, the driving and steering wheel 18 is secured to the chassis via a motor plate 28, which is pivotally mounted via a pivot link 30. A drive motor 32 that is operable to drive the driving and steering wheel 18 is secured on a top side of the motor plate 28. The motor 32 is activated by the operator to drive the driving and steering wheel 18. The motor 32 drives the driving and steering wheel 18 through a suitable gear train or the like.

Figure 7:
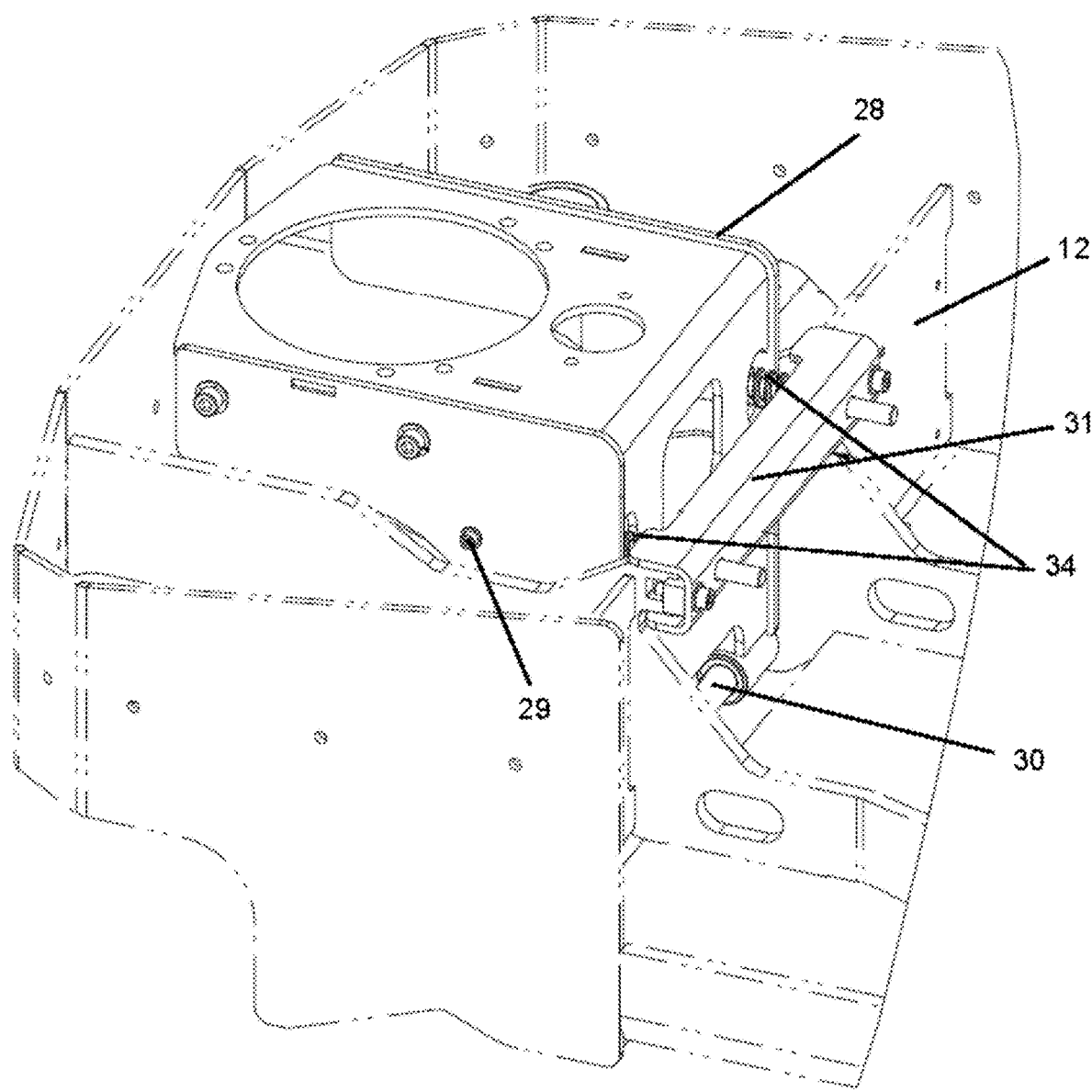
FIG. 7 is a perspective view of the motor plate.

A driving wheel suspension 34 such as a spring is secured between the motor plate 28 and the chassis 12. As noted, the suspension 34 assists the driving and steering wheel 18 to maintain traction and absorb ground irregularities. With reference to FIG. 7, the downward pivot range of the motor plate 28 is limited by downward limit stop 29 in the form of a screw or the like that extends through the chassis 12 into the pivot path of the motor plate 28. The assembly may include a similar stop on an opposite side of the motor plate 28. In some embodiments, the downward range of the motor plate 28 may be limited to 25 mm. The upward pivot range of the motor plate 28 is limited by a spring holder 31 to which the spring 34 is secured. The spring holder 31 may be fixed to the chassis 12. In an exemplary embodiment shown in FIG. 7, the assembly includes two lateral springs 34 coupled with the spring holder 31 (as opposed to a single central spring as shown in FIG. 5). As the motor plate 28 pivots upward, the motor plate 28 engages the spring holder 31 to limit upward displacement. In some embodiments, the upward range of the motor plate 28 may be limited to 10 mm.

Figure 8:
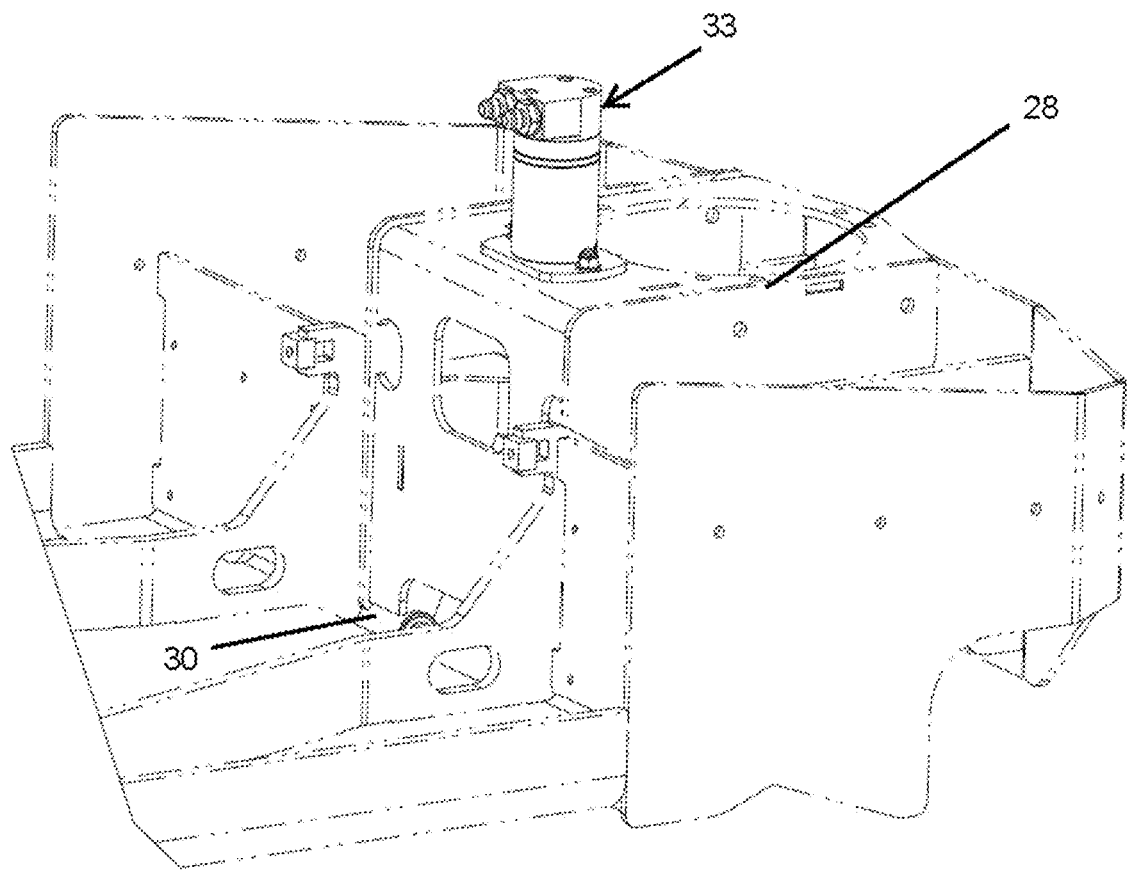
FIG. 8 shows the steering motor connected to the motor plate.
Figure 9:
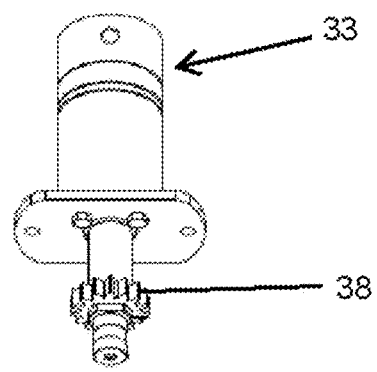
FIG. 9 shows the steering motor.

The driving and steering wheel 18 may be connected to a wheel gear 36 that is rotatable relative to the chassis 12. As shown, the wheel gear 36 is rotatable in the motor plate 28. An operator controlled control implement communicates with a steering motor 33, which in some embodiments may be a hydraulic motor. The steering motor drives a steering gear 38 directly engaging the wheel gear 36 in a direction according to a control position of the operator controlled control implement. See FIGS. 8 and 9.

Figure 10:
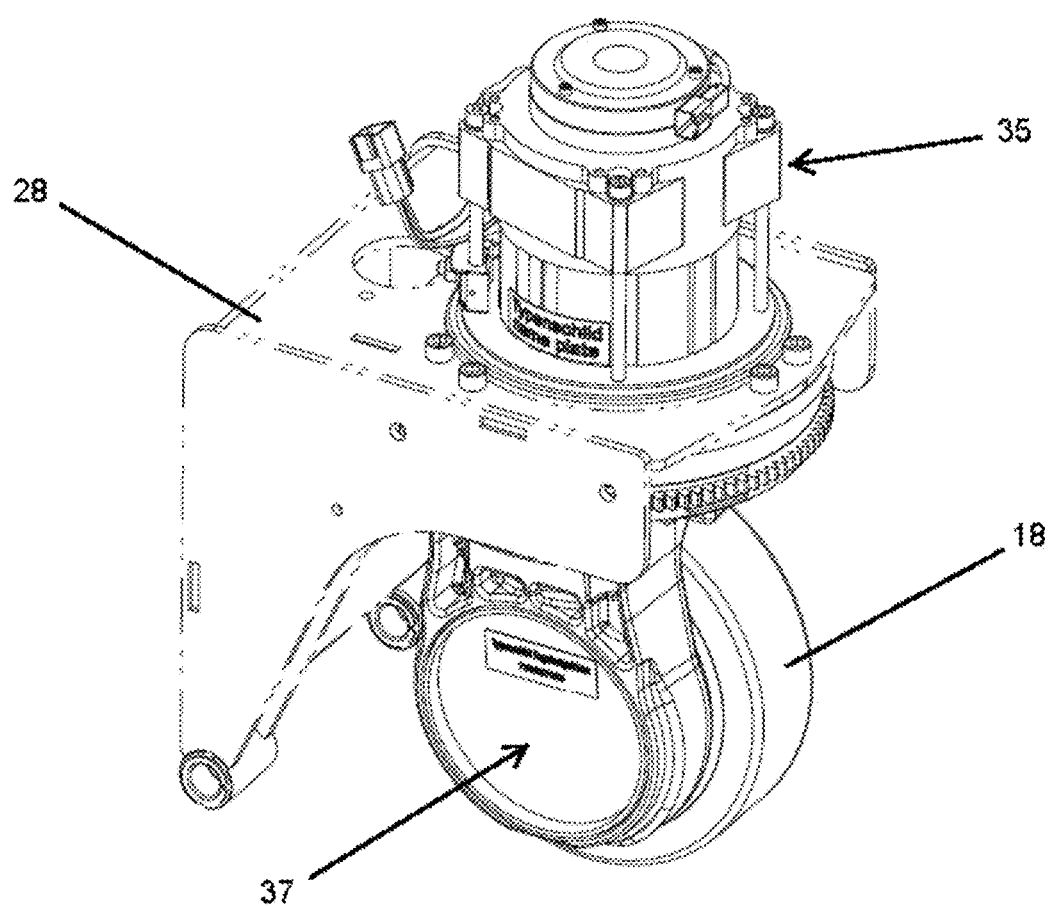
FIG. 10 shows the drive motor connected to the motor plate.

As shown in FIG. 10, a drive motor 35 is fixed to the motor plate 28. The drive motor 35 may be an electric motor with a directional gear. An output shaft of the drive motor 35 is coupled with a lower part 37 including a gear reducer via a gear train or the like to rotate/drive the driving and steering wheel 18.

Figure 11:
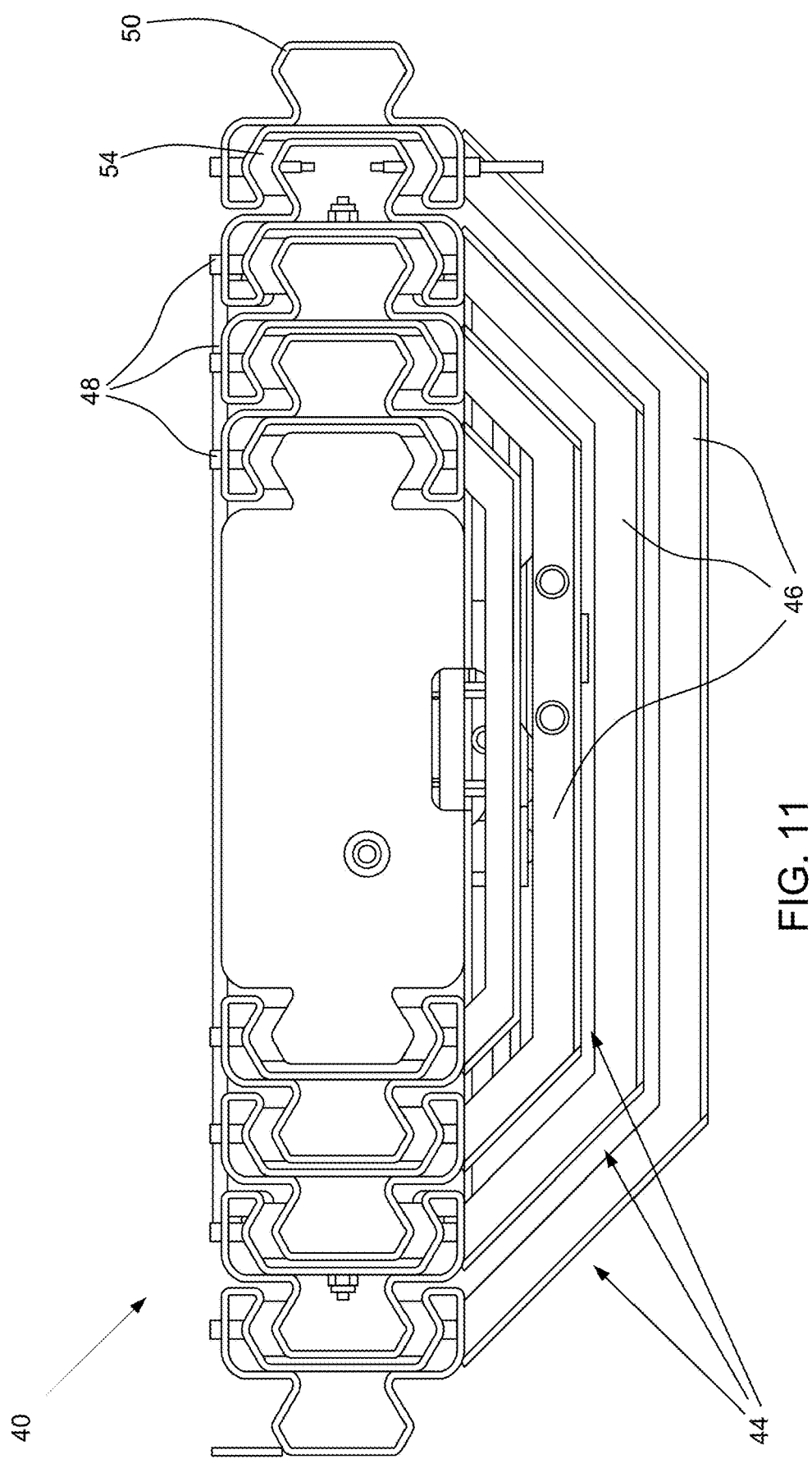
FIG. 11 is a plan view of the mast.
Figure 12:
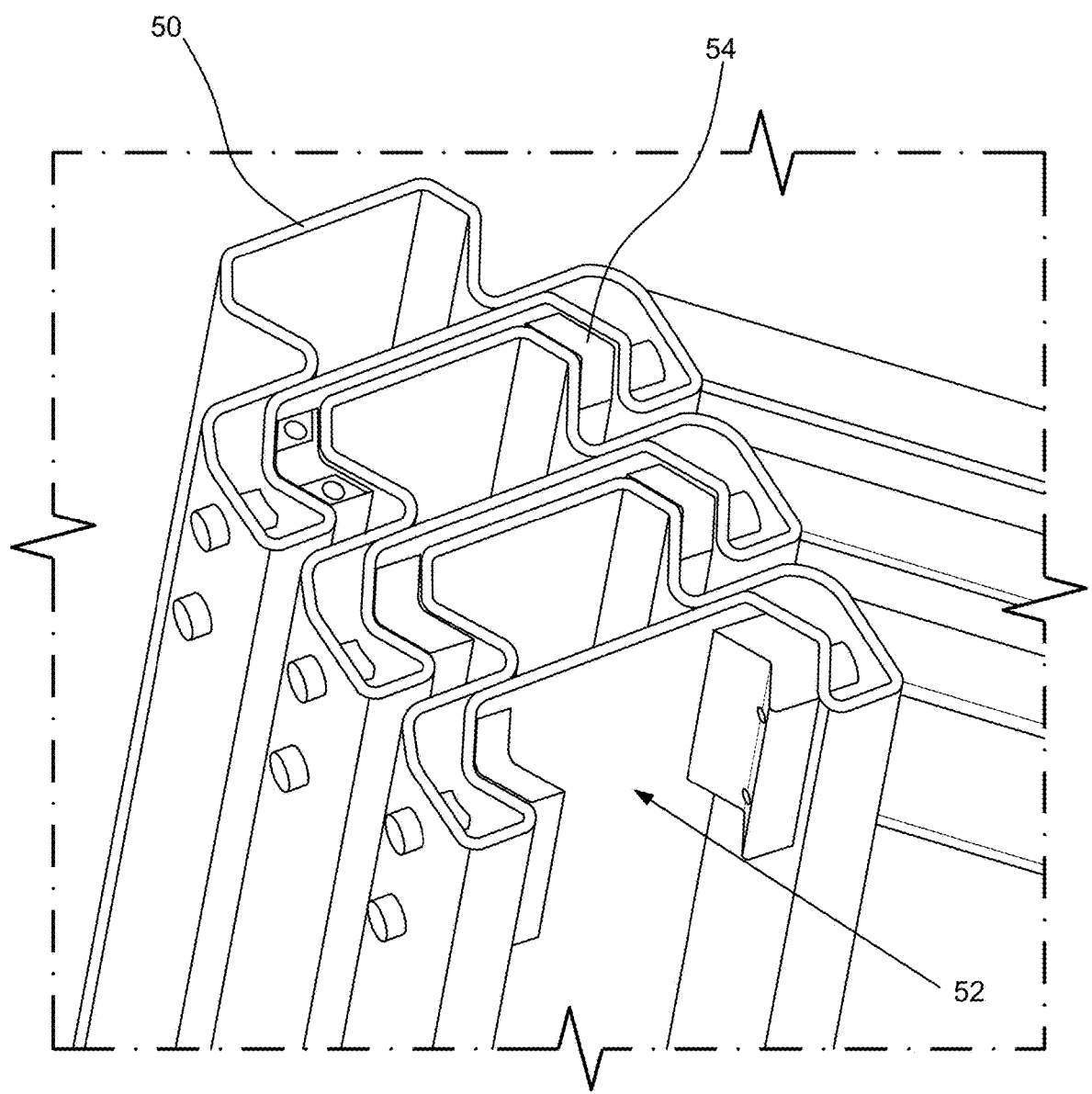
FIG. 12 is a detailed view of the mast profiles.

A mast 40 is secured between the mast supports 26. With reference to FIGS. 11 and 12, the mast 40 is displaceable between a lowered position and a raised position by a lift mechanism such as a hydraulic cylinder or the like. A work platform 42 (FIGS. 1 and 2) is secured to the mast 40 for displacement by the mast 40 between a lowered position and a raised position.

The mast 40 is composed of a plurality of telescoping mast sections 44. See FIG. 13. Each of the mast sections or mast elements 44 includes two cross members (including upper cross members 46 and lower cross members 47) and two profile units 48, one each connected to opposite ends of the cross members 46, 47. The upper cross members 46 may be welded to the structure for each element. The lower cross members 47 are defined by fixing a lowermost mast element 471 to the chassis 12, a first bolt on structure 472 at the bottom of the second element, a second bolt on structure 473 on the top element, and welded lower cross members on any other elements. The second bolt on structure 473 defines a platform support. The profile units 48 generally extend the length of the mast supports 26.

With continued reference to FIGS. 11 and 12, each of the profile units 48 includes a connector portion 50 and a receiver portion 52. A V-shaped slide member 54 is disposed between the connector portions 50 of one of the mast sections 44 and the receiver portions 52 of an adjacent mast section. As shown in FIG. 11, each of the upper and lower cross members 46, 47 is longer than an adjacent cross member 46, 47 such that each of the telescoping mast sections 44 fits over an adjacent mast section. The V-shaped slide members 54 are preferably fixed to inside facing surfaces of the receiver portions 52 of the profile units 48 (see FIG. 12).

With regard to the mast, with continued reference to the drawings, a double-slide link mast serves to guarantee on one hand the resistance and on the other hand to limit deflection. The mast fabrication process (cold forming) guarantees the necessary geometrical accuracy for the double slide link (hyperstatic). In an alternative construction, the mast may be assembled using hot forming profiles (technology used in industrial forklifts) for better compactness and rigidity. The hot rolled profile is higher in weight, however, and it is desirable to limit weight increase to the extent possible. Higher mast weight can lead to unfavorable dynamic stability of the machine (neutral for static stability because of the 'central' position of the mast).

Figures 13, 14, 15:
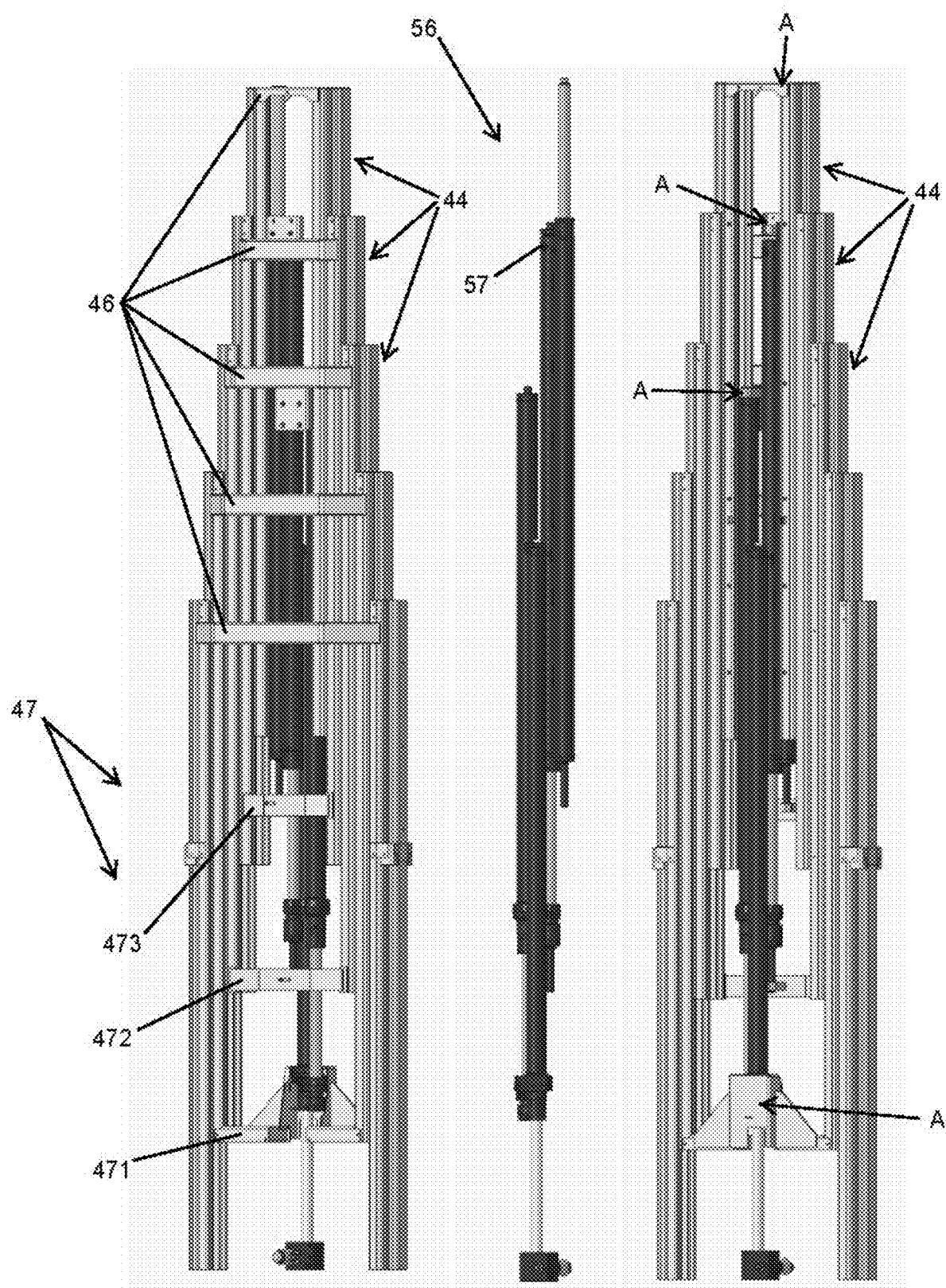
FIGS. 13-15 show the mast and lift cylinders.

FIG. 14 is an isolated view of the lift cylinder assembly 56 coupled between the chassis 12 and the mast 40. FIG. 15 is a view of the mast from an opposite side of FIG. 13. In some embodiments, the lift cylinder assembly 56 includes a multi-stage cylinder with multiple cylinders 57 connected two by two. Each cylinder 57 is connected to a mast element 44 to lift (and lower) the mast element 44. There is no need for synchronized movement, which simplifies the mast assembly and reduces maintenance requirements (e.g., fewer parts to be lubricated). The cylinders 57 are connected to the mast elements 44 at arrows A in FIG. 15.

An alternative mast may be positioned on the long side of the platform and incorporates an inverted V-shaped construction with telescoping sections. The mast provides for scissor-type functionality without the scissor mechanism.

FIGS. 16-23 show a modified control box/controls configuration including control handles with ergonomically positioned switches to control operation of the machine. The switches are positioned to enable an operator to use thumbs and forefingers to control drive, steer and mast lift up/down.

Figure 16:
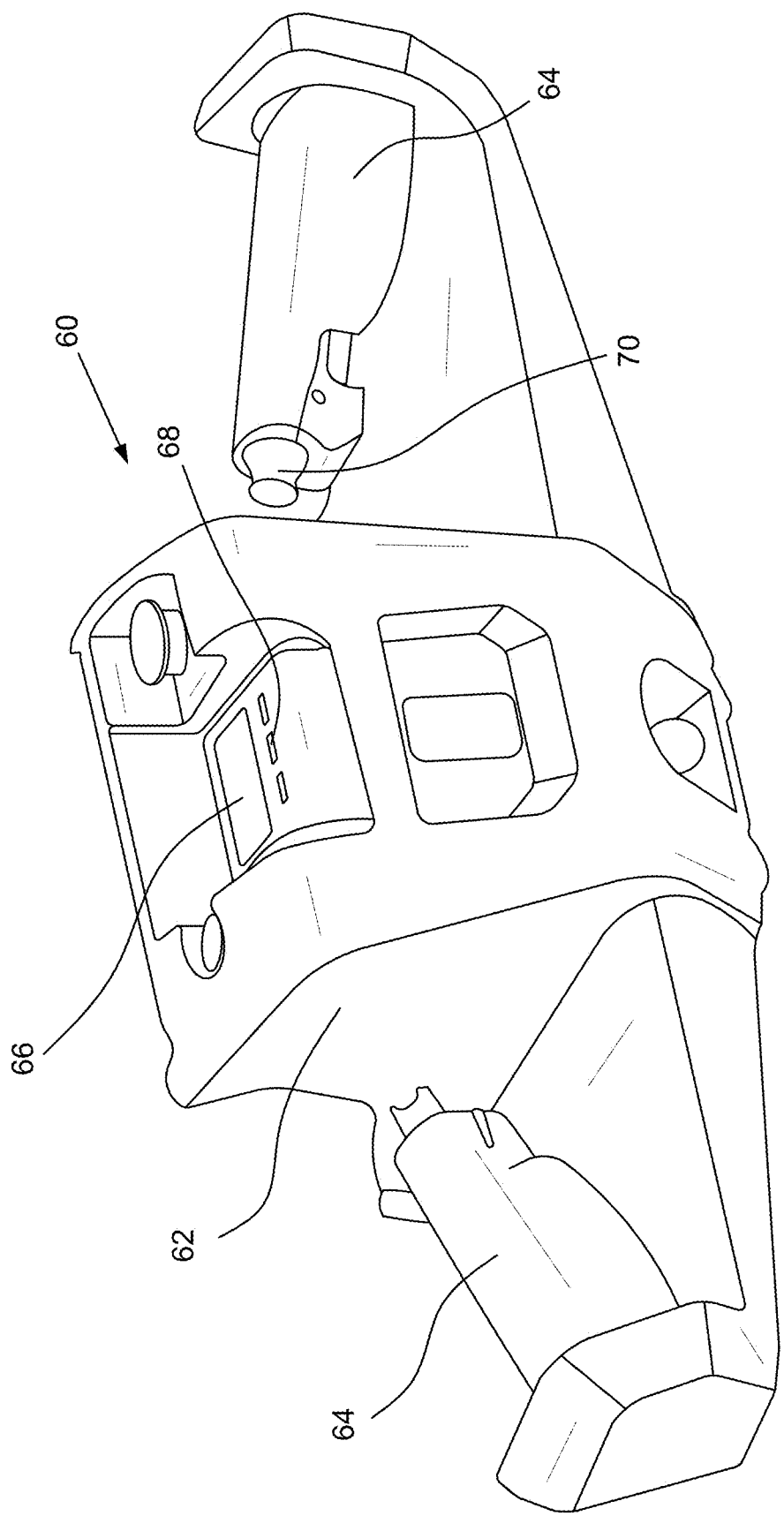
FIG. 16 shows an exemplary control implement.
Figure 17:
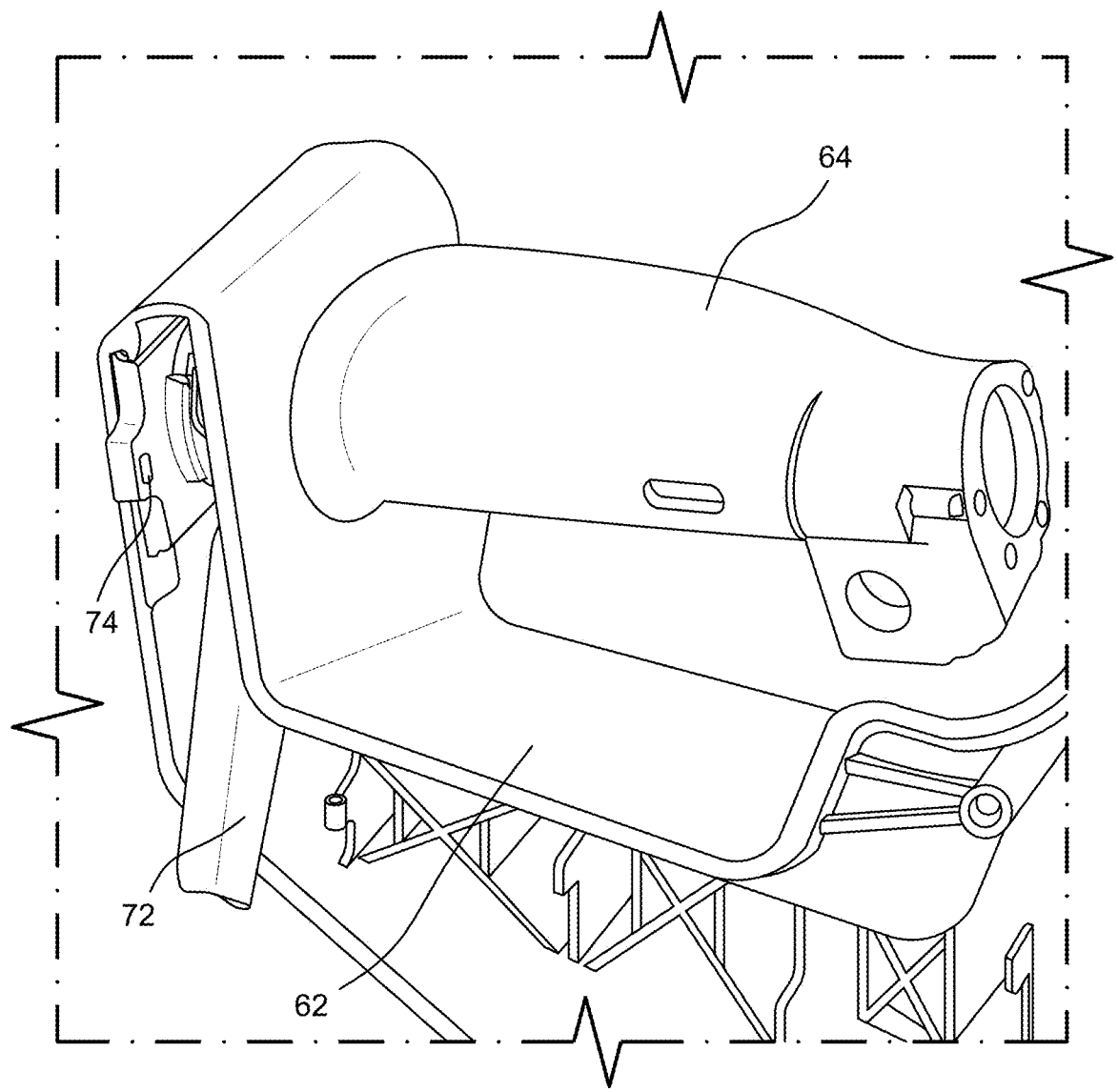
FIGS. 17-22 show a process for setting an angle position of the handles.

The control implement 60 is shown in FIG. 16. The control implement 60 includes a housing 62 and handles 64, coupled with the housing. A display 66 may provide an indication of steering wheel position and other machine information. A user interface 68 may facilitate user-configurable steering behavior and/or user-configurable machine performance. The user may also designate "auto-center" steering wheel configuration for driving in line. Other features and functions may be accessible via the display 66 and user interface 68.

The handles 64 provide for operator stability and may include a palm rest for upper body strain relief. Switches 70 may be positioned for natural thumb movement. Additionally, the handles 64 may be provided with contactless operator detection to activate control operation. The contactless operator detection may use optical technology, a capacitance sensor, or the like.

Figure 22:
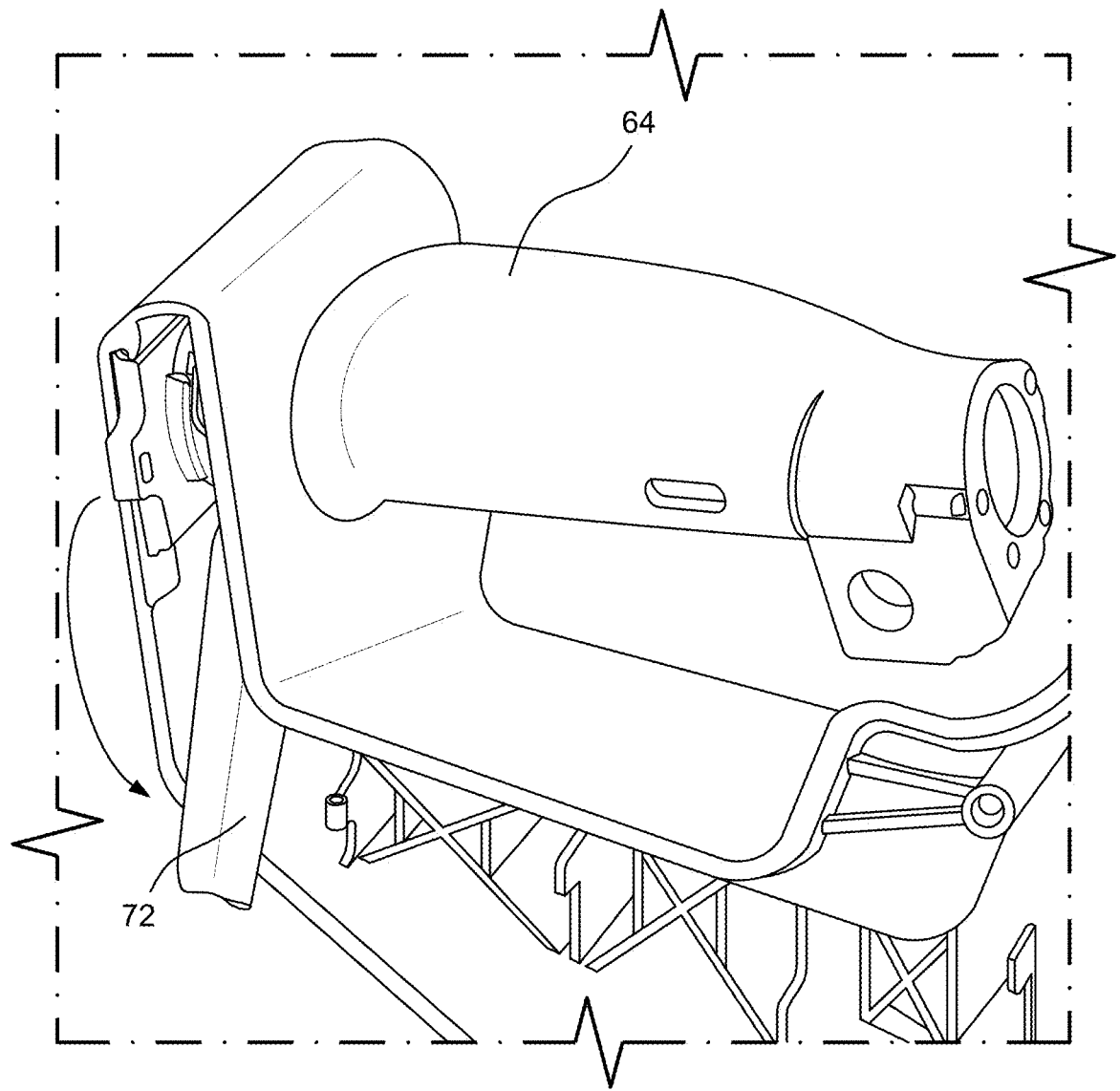
Figure 23:
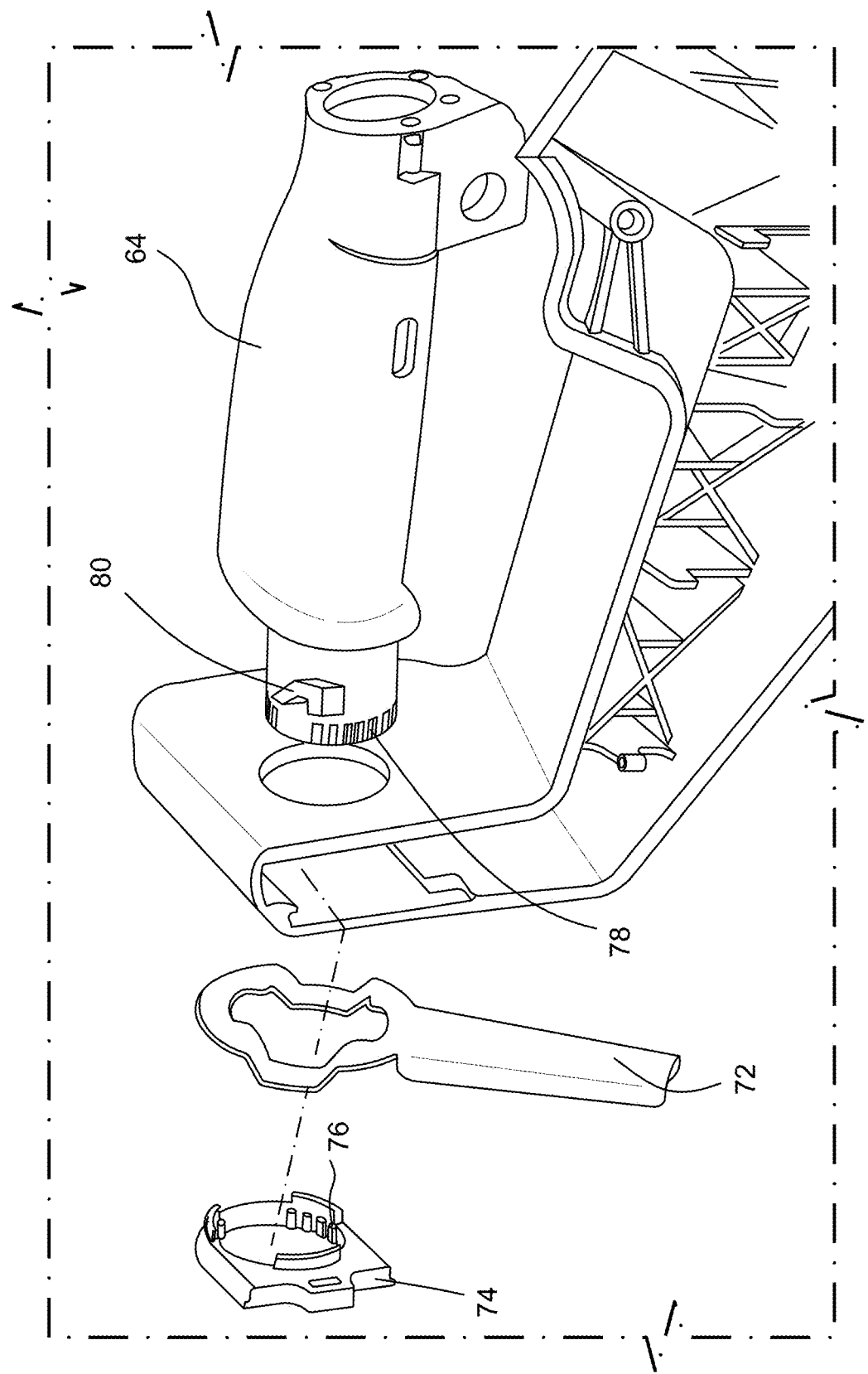
FIG. 23 is an exploded view showing components of the handle assembly.

It is desirable to enable the handles 64 to be adjusted/positioned according to an operator's size by twisting the position of the handles 64. For example, with a joystick, button and palm rest forming part of the handle 64, these components are linked to follow the user's wrist configuration. It has been discovered that a few degrees of adjustment is suitable to accommodate a wide range of operator sizes. FIGS. 17-22 illustrate the components and procedure for adjusting an angle position of the handle 64. A lock bar 72 is cooperable with the handle 64 and the housing 62 and is displaceable between a lock position and an unlock position. A back plate 74 is coupled with the housing 62 and is cooperable with the handle 64 and the lock bar 72. The lock bar 72 is positioned between the handle 64 and the back plate 74. As shown in FIG. 23, the back plate 74 includes a plurality of locking tabs 76 that engage corresponding locking slots 78 on the handle 64 when the lock bar 72 is in the lock position.

Figure 18:
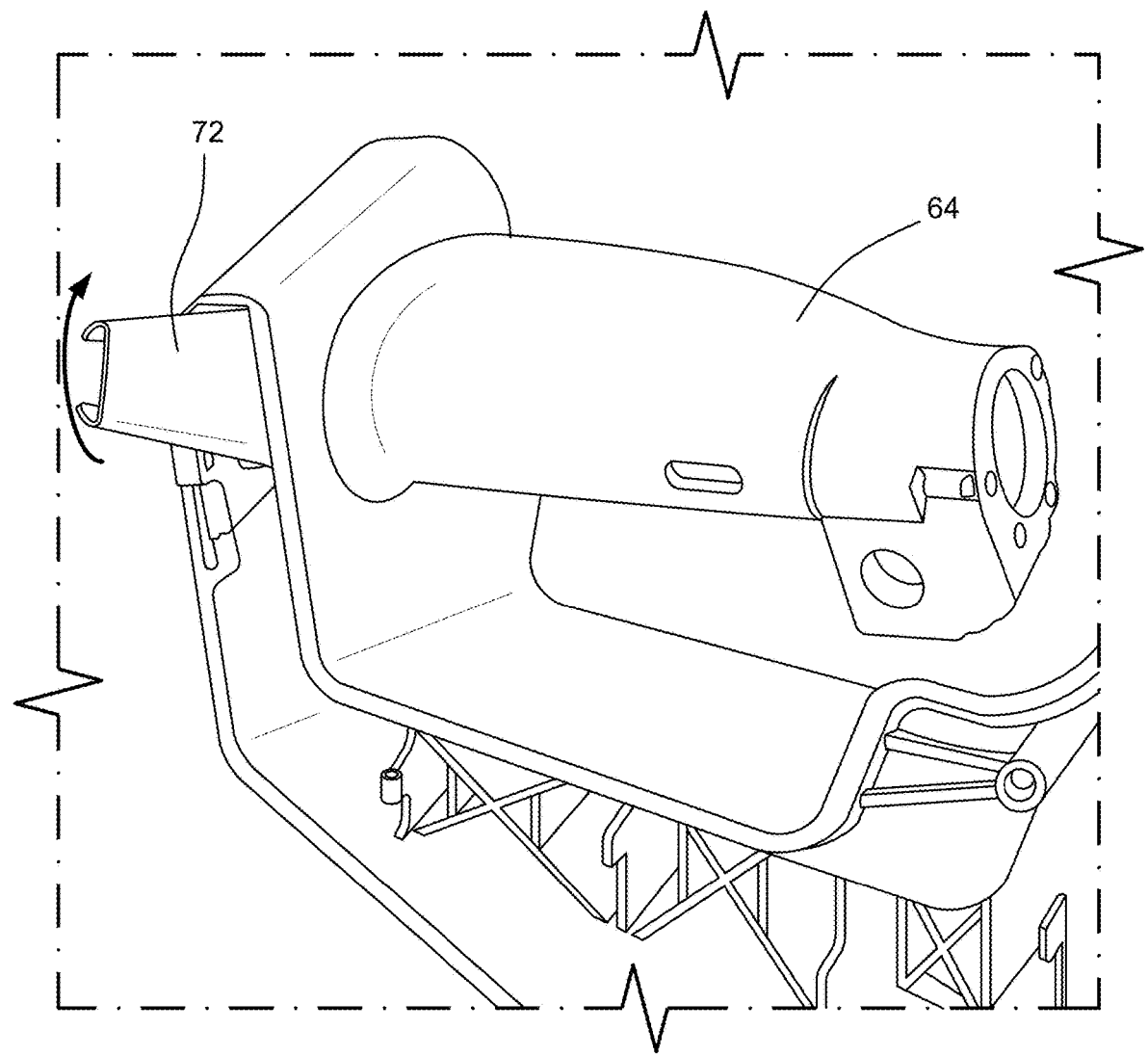
Figure 19:
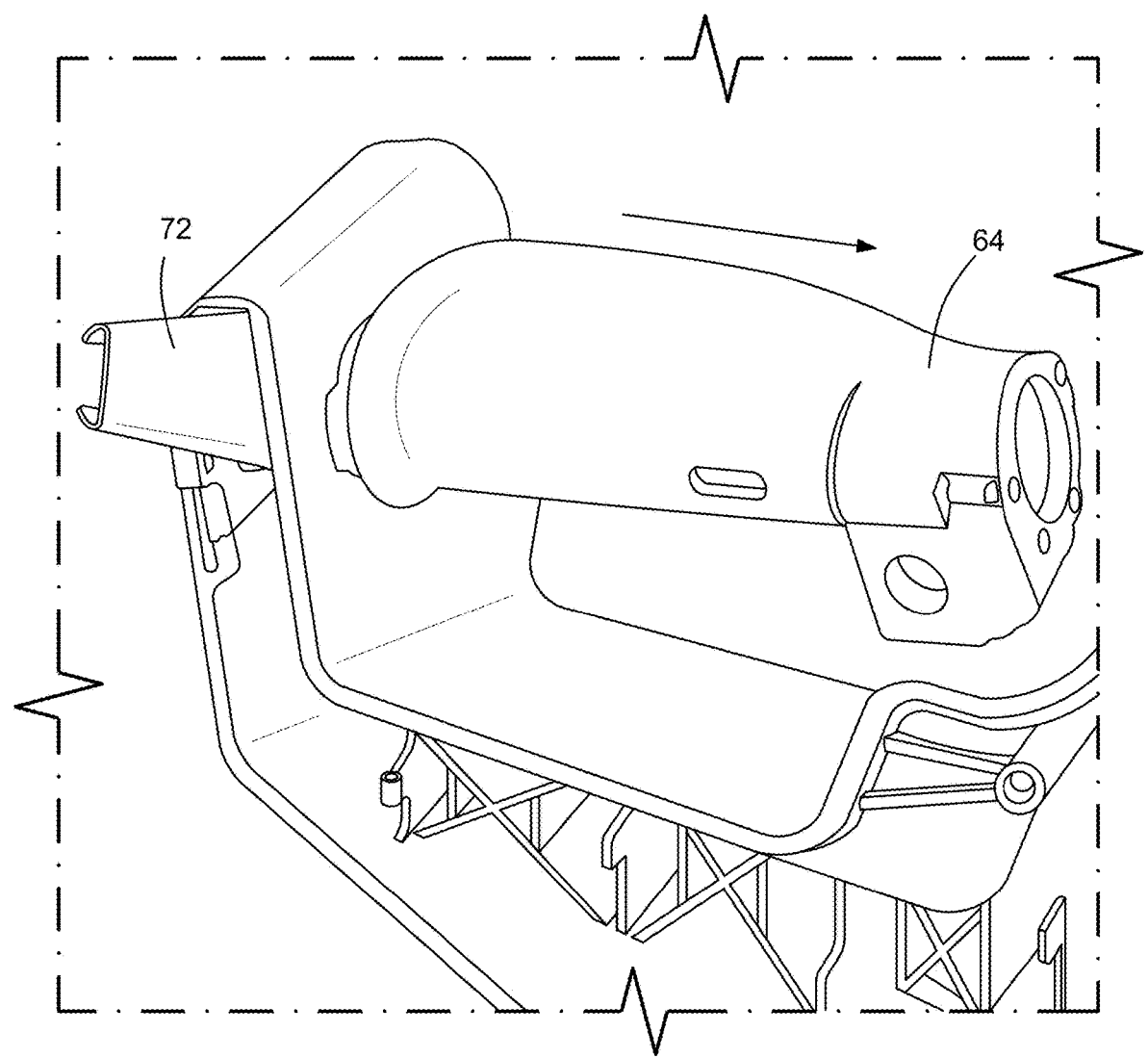
Figure 20:
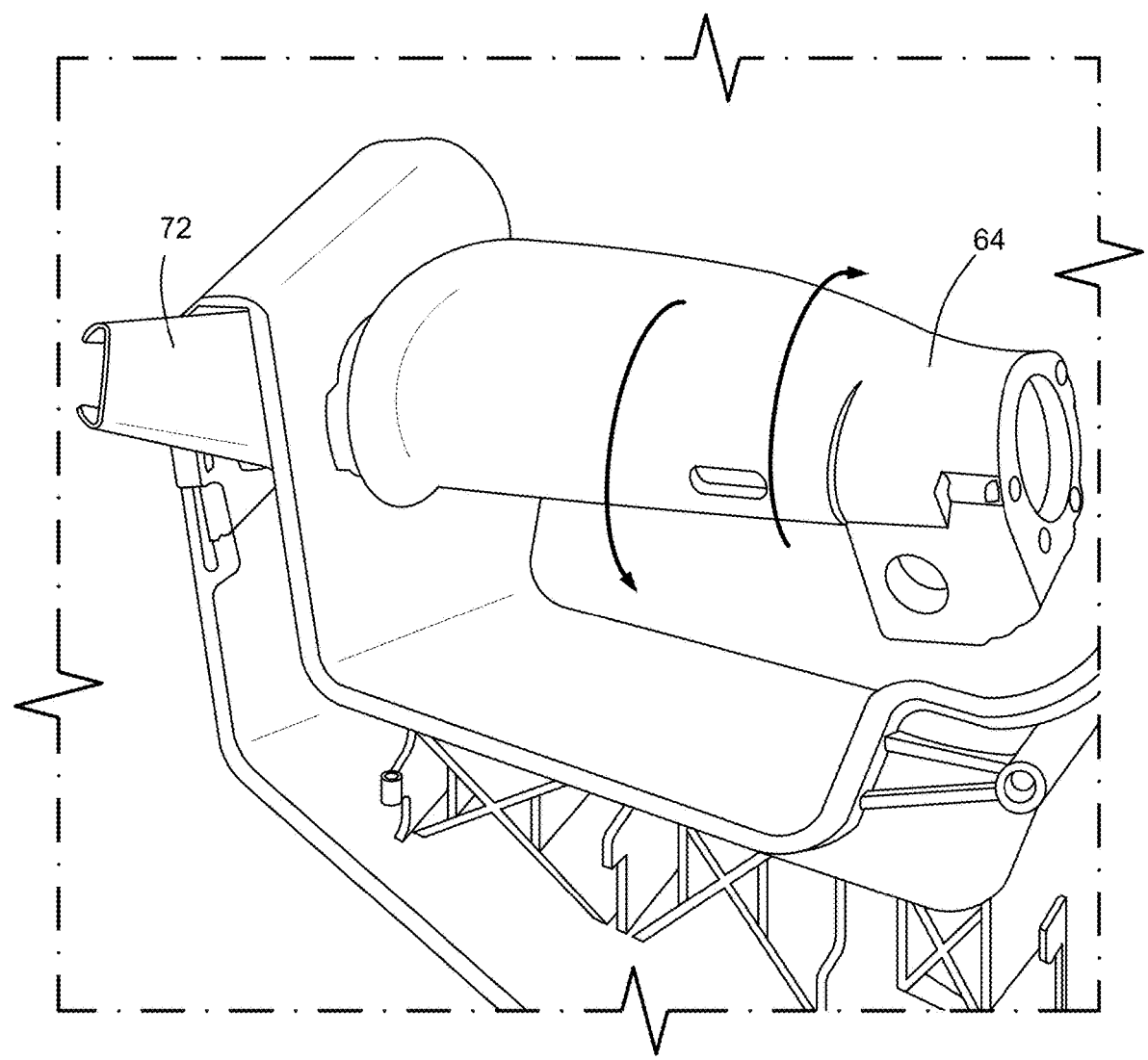
Figure 21:
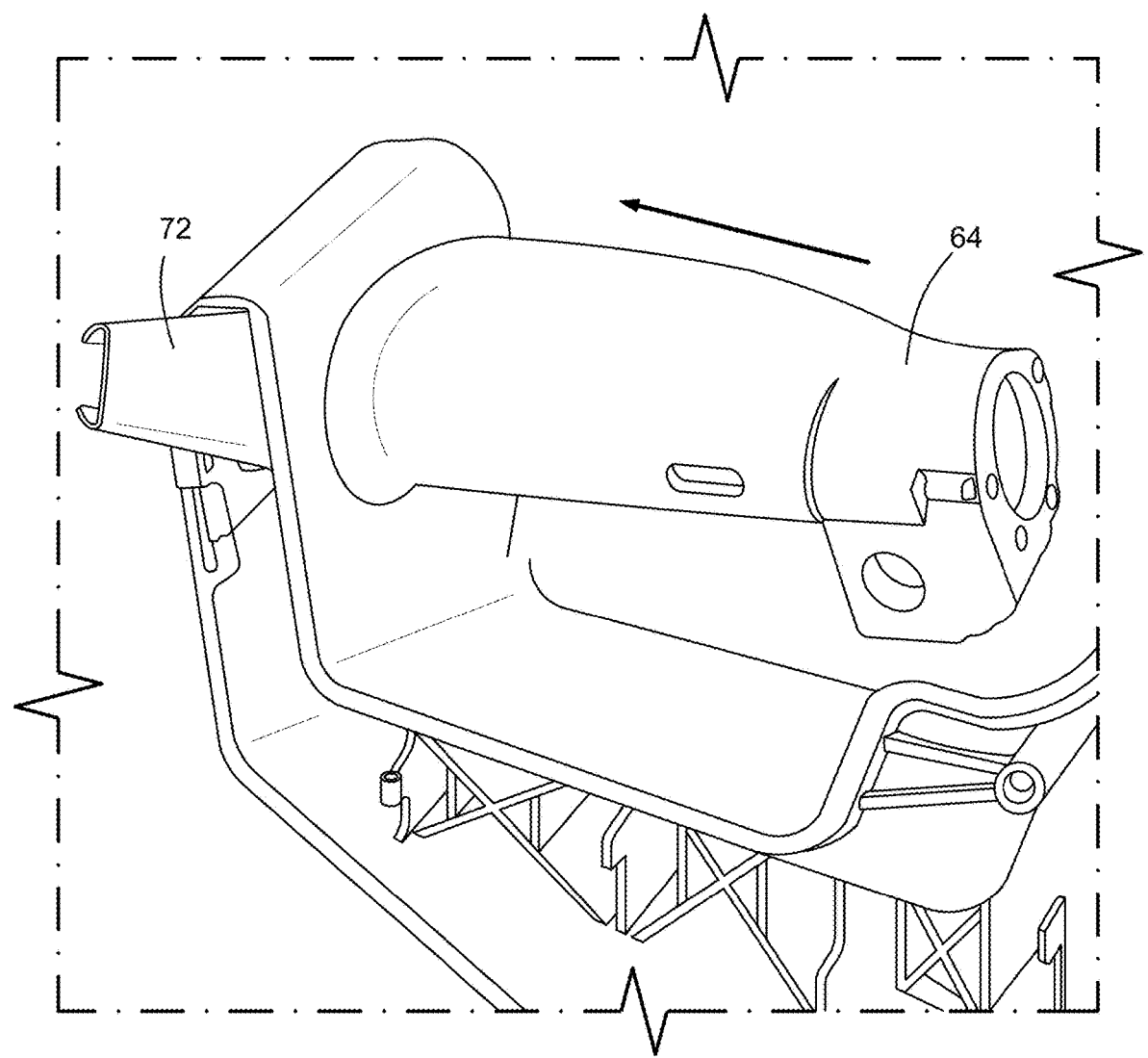

To adjust the angle position of the handle 64, the lock bar 72 is displaced from the lock position (FIG. 17) to the unlock position (FIG. 18). In this position, the lock bar 72 releases a tab member 80 of the handle 64 so that the handle 64 can be laterally displaced away from the housing (to the right in FIG. 19). In this position, the handle 64 can be rotated to a desired position (for example, one of three positions defined by tab members on the back plate 74 as shown in FIG. 23). Once the handle 64 is set in a proper position, the handle is laterally displaced back toward the housing (to the left in FIG. 21), and the lock bar 72 is returned to the lock position as shown in FIG. 22. The same procedure is conducted for the handle 64 on the opposite side of the control implement.

The MEWP of the described embodiments incorporates components that are suitable across numerous vehicle types. The chassis and drive configuration provides for a more stable vehicle, particularly over uneven terrain. The mast may be telescoped beyond 5 m without reduction in performance. The control implement is adjustable to accommodate varying operator sizes and ergonomics.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A mobile elevating work platform comprising:
   a chassis;
   a pair of fixed wheels secured to the chassis;
   a pair of caster wheels secured to the chassis;
   a driving and steering wheel secured to the chassis;
   a control implement coupled with the driving and steering wheel, the control implement being configured to adjust a steering position of the driving and steering wheel;
   a drive motor operable to drive the driving and steering wheel; and
   a driving wheel suspension secured between the driving and steering wheel and the chassis.

2. A mobile elevating work platform according to claim 1, wherein the control implement is coupled with the drive motor and includes a drive switch that is configured to activate the drive motor.

3. A mobile elevating work platform according to claim 1, wherein the driving wheel suspension comprises a spring.

4. A mobile elevating work platform according to claim 3, wherein the chassis comprises a pivot link, and wherein the drive motor and the driving and steering wheel are pivotally secured to the chassis via the pivot link.

5. A mobile elevating work platform according to claim 1, wherein the driving and steering wheel is connected to a wheel gear that is rotatable relative to the chassis, and wherein the control implement is coupled with a steering motor that drives a steering gear engaging the wheel gear.

6. A mobile elevating work platform according to claim 1, wherein the chassis comprises a pair of fixed rear wheel wells, a pair of caster wheel wells, a driving and steering wheel well, and mast supports.

7. A mobile elevating work platform according to claim 1, further comprising a mast secured to the chassis and displaceable between a lowered position and a raised position, and a work platform coupled and displaceable with the mast.

8. A mobile elevating work platform according to claim 7, wherein the mast comprises a plurality of telescoping mast sections, each of the telescoping mast sections including:
   a cross member;
   two profile units one each connected to opposite ends of the cross member, each of the two profile units including a connector portion and a receiver portion; and
   a V-shape slide member disposed between the connector portions of one of the mast sections and the receiver portions of an adjacent mast section, wherein each of the cross members is longer than an adjacent cross member such that each of the telescoping mast sections fits over an adjacent mast section.

9. A mobile elevating work platform according to claim 1, wherein the control implement comprises:
a housing;
a handle coupled with the housing and maneuverable between an initial position and an adjusted position;
a lock bar cooperable with the handle and displaceable between a lock position and an unlock position, wherein the handle is maneuverable between the initial position and the adjusted position when the lock bar is in the unlock position; and
a back plate coupled with the housing and cooperable with the handle and the lock bar, wherein the lock bar is positioned between the handle and the back plate, and wherein the back plate comprises locking tabs engaging the handle when the lock bar is in the lock position.

10. A mobile elevating work platform comprising:
a chassis;
a pair of fixed wheels secured to the chassis;
a pair of caster wheels secured to the chassis;
a driving and steering wheel secured to the chassis;
a control implement coupled with the driving and steering wheel, the control implement being configured to adjust a steering position of the driving and steering wheel; and
a drive motor operable to drive the driving and steering wheel, wherein the driving and steering wheel is secured to the chassis between and in alignment with the pair of caster wheels.

11. A mast for a mobile elevating work platform, comprising a plurality of telescoping mast sections, each of the telescoping mast sections including:
a cross member;
two profile units one each connected to opposite ends of the cross member, each of the two profile units including a connector portion and a receiver portion; and
a V-shape slide member disposed between the connector portions of one of the mast sections and the receiver portions of an adjacent mast section,
wherein each of the cross members is longer than an adjacent cross member such that each of the telescoping mast sections fits over an adjacent mast section.

12. A mast according to claim 11, wherein the V-shape slide members are fixed to inside facing surfaces of the receiver portion.

13. A control implement comprising:
a housing;
a handle coupled with the housing and maneuverable between an initial position and an adjusted position;
a lock bar cooperable with the handle and displaceable between a lock position and an unlock position, wherein the handle is maneuverable between the initial position and the adjusted position when the lock bar is in the unlock position; and
a back plate coupled with the housing and cooperable with the handle and the lock bar, wherein the lock bar is positioned between the handle and the back plate, and wherein the back plate comprises locking tabs engaging the handle when the lock bar is in the lock position.

* * * * *